United States Patent [19]
Pilney et al.

[11] Patent Number: 5,298,883
[45] Date of Patent: Mar. 29, 1994

[54] PROXIMITY ALERT SYSTEM

[76] Inventors: Richard G. Pilney, P.O. Box 11 Smithfield St., Jefferson County, Dilonvale, Ohio 43917; Ronald E. Ham, 6505 Huckleberry Cove, Austin, Tex. 78742

[21] Appl. No.: 822,120
[22] Filed: Jan. 17, 1992
[51] Int. Cl.$^5$ .............. G08B 23/00; H04B 1/38
[52] U.S. Cl. .................. 340/573; 455/89; 345/98
[58] Field of Search ........... 340/573, 691, 384 E, 340/574, 329, 331, 311.1, 435–436, 903, 825.49, 825.44, 825.19; 455/88–89; 343/702; 342/24, 118, 132; 364/561

[56] References Cited

U.S. PATENT DOCUMENTS

| | | | |
|---|---|---|---|
| 3,718,896 | 2/1973 | Mowat | 342/24 X |
| 4,628,306 | 12/1986 | Root | 340/825 |
| 4,675,656 | 6/1987 | Narcisse | 340/539 |
| 4,850,031 | 7/1989 | Allsop et al. | 455/89 X |
| 4,851,820 | 7/1989 | Fernandez | 340/825.44 |
| 4,931,772 | 6/1990 | Bechtold | 340/573 |
| 4,949,072 | 8/1990 | Comerford et al. | 340/525 |
| 4,973,944 | 11/1990 | Maletta | 340/568 |
| 4,978,946 | 12/1990 | Nordholm et al. | 340/573 |
| 5,067,441 | 11/1991 | Weinstein | 340/573 X |

Primary Examiner—John K. Peng
Assistant Examiner—Thomas J. Mullen, Jr.
Attorney, Agent, or Firm—Henderson & Sturm

[57] ABSTRACT

A proximity alert system including a pair of portable electronic, coded transmitter/receiver units designed to operate in a specific signal band. Each unit transmits a coded signal that is picked up by the other unit. The strength of the received coded signal controls the rate of an audible beeper. The rate of the beeper indicates the approximate distance between companion units. A direction-finder antenna is used to indicate the direction of the received coded signal.

11 Claims, 4 Drawing Sheets

PROXIMITY ALERT SYSTEM

TECHNICAL FIELD

This invention relates to personal security and safety communications, and more particularly to a portable proximity alert system for hunters, hikers and other outdoor adventurers.

BACKGROUND ART

When participating in outdoor activities with others, it is often desirable to know the location of other participants. This is particularly true when engaging in potentially dangerous activities such as hunting under conditions where the co-participants cannot easily see one another.

Although numerous signal and alarm protection units are known, none provide an indication of the approximate distance and direction of one unit with respect to another companion unit.

Those concerned with these and other problems recognize the need for an improved proximity alert system.

DISCLOSURE OF THE INVENTION

The present invention provides a proximity alert system including a pair of portable electronic, coded transmitter/receiver units designed to operate in a specific signal band. Each unit transmits a coded signal that is picked up by the other unit. The strength of the received coded signal controls the rate of an audible beeper. The rate of the beeper indicates the approximate distance between companion units. A direction-finder antenna is used to indicate the direction of the received coded signal.

An object of the present invention is the provision of an improved proximity alert system.

Another object is to provide a battery operated transmitter/receiver alert system to be used by hunters, hikers, campers and other outdoor adventurers.

A further object of the invention is the provision of a proximity alert system that indicates approximate distance and direction of companion portable units.

Still another object is to provide a proximity alert system that is uncomplicated and inexpensive.

A still further object of the present invention is the provision of a proximity alert system that is convenient to use and easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figures 1, 2:
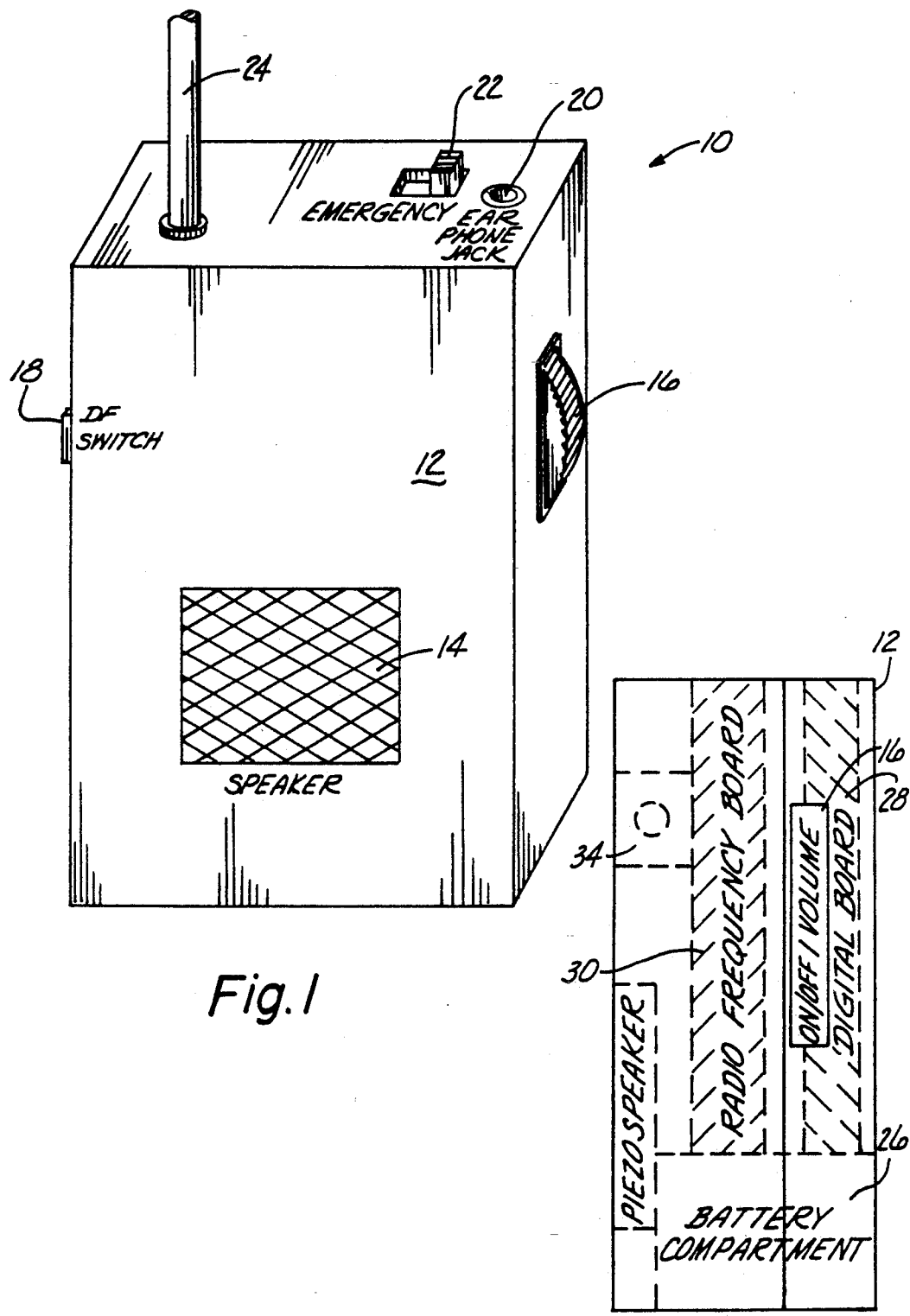
FIG. 1 is a perspective view of one of an identical pair of the portable proximity alert units of the present invention.
FIG. 2 is a sectional view of the alert unit illustrating the placement of the components in the housing.

Referring now to the drawings, wherein like reference numerals designate identical or corresponding parts throughout the several views, FIG. 1 shows one of the portable proximity alert units (10) of the present invention. Each alert unit (10) has a weather-resistant housing (12). The housing (12) includes a speaker grid (14), an on-off-volume switch (16), a direction-finding switch (18), an earphone jack (20), and an emergency switch (22). A seven (7) inch long flex monopole antenna (24) extends up from the top of the housing (12).

FIG. 2 illustrates the general placement of the battery compartment (26), the digital printed circuit board (28), the radio frequency board (30), the speaker (32), and the ferrite loop direction finding antenna (34) within the housing (12).

Figure 3:
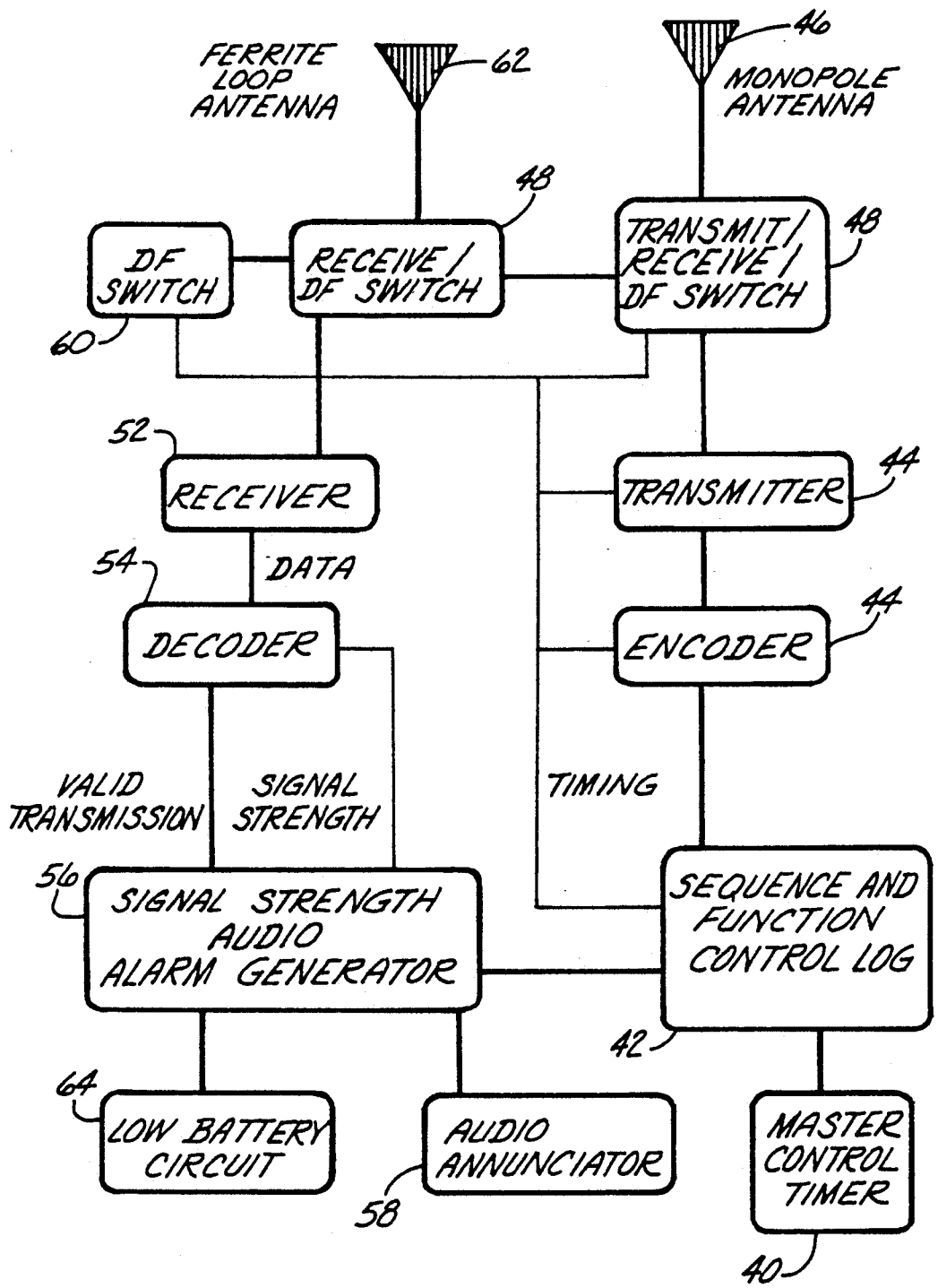
FIG. 3 is a block diagram of the proximity alert system.

Referring now to FIG. 3, a block diagram of one embodiment of the alert unit (10) is shown. The master control timer (40) initiates a signal from the control logic (42) that turns on the transmitter (44), and switches azimuthally omnidirectionally monopole antenna (46) to the output of the transmitter (44) by way of the transmit/receive switch (48). The encoder (50) then generates a unique address code followed by data bits determined by switches and/or buttons on the exterior of the unit. This serial sequence toggles the transmit frequency of the transmitter (44) thereby transmitting the address and data on a frequency shifted radio carrier.

After transmitting this identifying sequence, the unit waits for a period of time determined by the master control timer (40) and control logic (42) before transmitting another sequence. During this time, the receiver (52) is activated and the transmit/receive switch (48) routes the output of the monopole antenna (46) to the input of the receiver (52). If another unit is in the vicinity, the signal is received, demodulated and routed to the decoder (54). If the address code is correct, a "data good" output pulse is generated along with the decoded data from the transmitter (44). The "data good" output causes the logarithmic signal level output from the receiver (52) to be routed to the control logic (42). The control logic (42) establishes the approximate distance of the remote transmitting unit from the local receiver and passes an instruction signal to the audio alarm generator (56) and audio annunciator (58) for alerting the user of the presence of another unit and the approximate distance to that unit. Additionally, the decoded data is used to signal for emergency help, presence of a specific type of unit or virtually any other message. When a message is being received, the master control timer (40) operation is inhibited to prevent simultaneous transmissions.

The direction to a transmitting unit is determined by pushing the DF button (60). When depressed, the transmitter (44) is disabled and the unit is used only for receiving and the omnidirectional pattern from the monopole antenna (46) is combined in the beam former with the cosinusoidal pattern of the loop antenna (62) to generate a cardioid pattern. This pattern has a maxima in one direction and a minima 180 degrees away; therefore, the direction to the transmitter can be unambiguously determined by measurement of the maximum or minimum signal level. During DF measurement, the logarithmic signal level continues to be routed to the control logic (42). An audible tone or sequence of tones is generated by the sound generator (56)/annunciator (58) to provide the operator with an indication of the relative signal level each time a valid address code sequence, as determined by the decoder (54), is received. Releasing the DF button (60) returns the unit to normal transmit/receive operation.

The unit is powered by an internal battery that is switched out of the circuit when the unit is not in use. The battery voltage is regulated, conditioned and monitored in the low battery circuit (64) before being routed to the other circuits. An output from the low battery circuit (64) causes the control logic (42) to activate the audio alarm generator (56) when the battery voltage falls below normal operating level. This results in a unique audio alarm output that indicates the battery should be changed.

Figure 4:
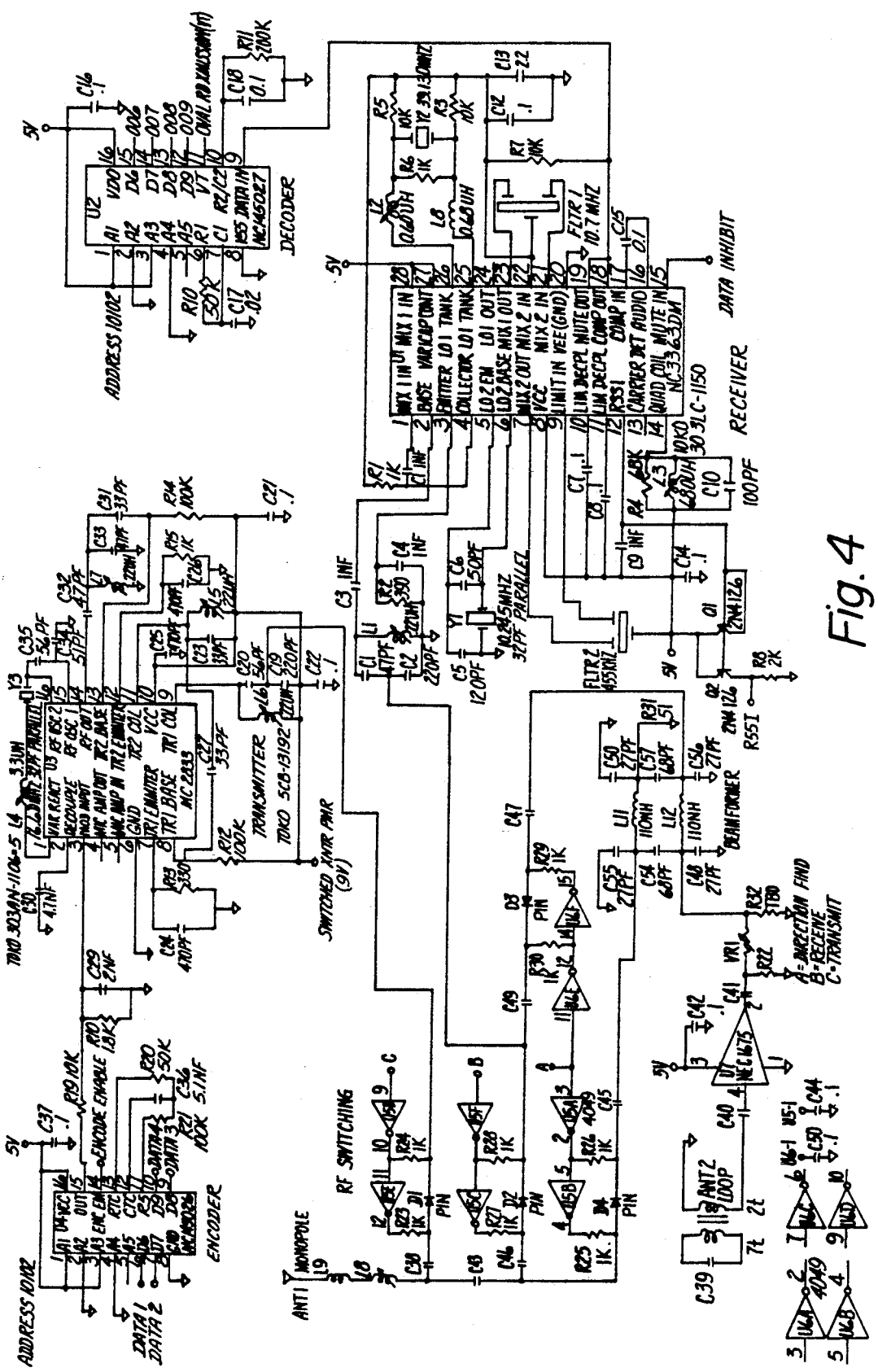
FIG. 4 is a detailed circuit diagram of the radio frequency board.
Figure 5:
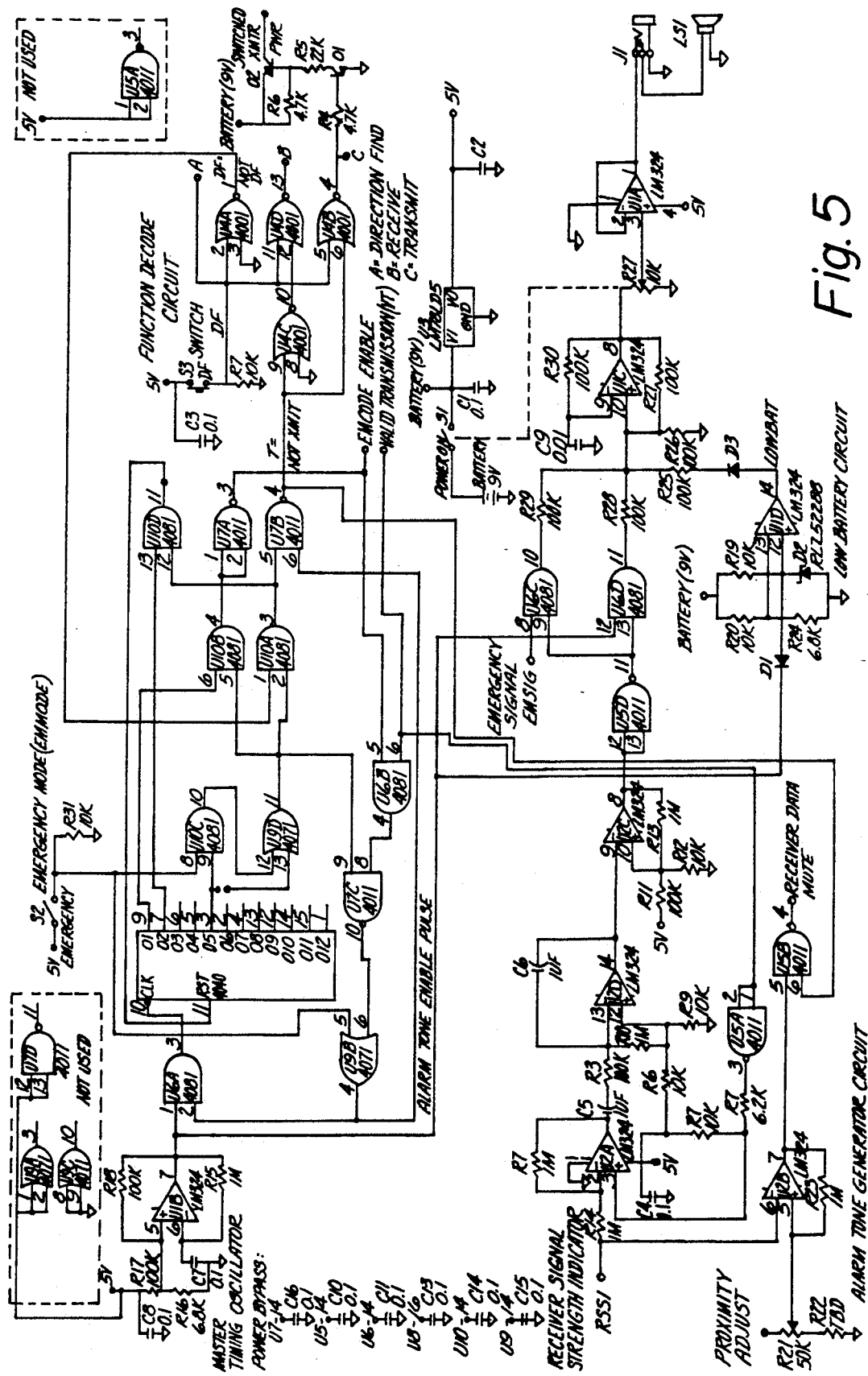
FIG. 5 is a detailed circuit diagram of the digital board.

Referring now to FIG. 4, the schematic diagram pertains to the "RF board" which contains the following circuits: ENCODER, DECODER, RECEIVER, TRANSMITTER, SEQUENCE/FUNCTION CONTROL LOGIC, and MONOPOLE and LOOP ANTENNAS. FIG. 5 pertains to the "Digital board" containing the MASTER CONTROL TIMER, AUDIO ALARM GENERATOR AND ANNUNCIATOR, LOW BATTERY CIRCUIT, DIRECTION FINDING (DF), EMERGENCY SIGNAL GENERATOR and FIELD STRENGTH INDICATOR CIRCUITS.

The unit is designed for low power consumption with eight hours or longer average battery life using one 9 volt alkaline or lithium battery. An audible signal warning during power-up is used to ensure maximum transmitter power. Low battery signal consists of continuous tone beeps. The battery must be replaced at this time or the remote receiver will not be able to determine the distance between two units. The battery is easily replaced in the home or the field.

The operating frequency of the unit is in the 49 MHz FCC part 15 range. The transmitter and receiver are on the same frequency, operating at alternate intervals. When the transmitter is on, the receiver is off. Conversely, when the receiver is listening, the transmitter is off. Frequency modulated, coded sequences are used to eliminate false alerts, provide a unique emergency signal sequence, and to allow unambiguous direction finding in the presence of multiple transmitters. The unit transmits a 100 millisecond code sequence every three to 15 seconds (internally adjustable). The maximum transmit interval should be used when there is a high density of units in the same area. Transmission is disabled when a signal is being received. A series of beeps indicates normal operation. Low battery condition is indicated by continuous rapid beeping until the unit is turned off. The emergency transmit code is a specific combination of data bits following the "unit type" address code. The unit sending the emergency transmit code continues to "listen" for arriving help.

The receiver section decodes the FM pulse coded signals sent by another proximity alert transmitter, and detects signal strengths up to five hundred yards. The audible responses produced upon reception of signals between approximately 10 yards and 500 yards produces the audible responses as shown in Table 1, upon receipt of the appropriate address code.

TABLE 1

| APPROXIMATE DISTANCE IN YARDS | AUDIBLE RESPONSE IN "BEEPS" PER SECOND |
| --- | --- |
| 10–20 | 6 |
| 20–40 | 5 |
| 40–80 | 4 |
| 80–160 | 3 |
| 160–320 | 2 |
| 320–Unit Limit | 1 |

Audible alert signals are disabled for distances less than a nominal five yards to prevent continuous alerts when individuals are close together. If an emergency signal is detected, the audio output beep frequency changes alerting the receiving unit of an emergency situation. The emergency signal has priority over normal transmission and operates up to the unit's maximum range-nominally 500 yards.

To locate the remote transmitter's direction, the DF button is pressed and held. The number of beeps from the audio output varies as the signal strength changes when the unit is rotated. A series of beeps are generated each time a properly coded signal is received. The unit is slowly rotated through a 360 degree circle until a maximum beep count is received. The direction indicated by the arrow on top of the unit is the direction of the other alert unit. The DF button is released to determine if the distance to the other unit has changed.

The audio output section includes a miniature piezoelectric speaker driven by an audio function generator that produces tone frequencies, pulse widths and pulse repetition rates appropriate to the received address code, signal strength and data bits. An earphone jack is provided for silent listening. Engaging the earphone disconnects the speaker.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. A portable proximity alert system, comprising:
    a first portable unit including transmitter means for producing a first coded signal, receiver means for receiving and determining the strength of a second coded signal, and first warning means for producing a variable rate proximity warning signal having a frequency variable in proportion to the strength of the second coded signal received by the first portable unit;
    a second portable unit including transmitter means for producing the second coded signal, receiver means for receiving and determining the strength of the first coded signal, and second warning means for producing a variable rate proximity warning signal having a frequency variable in proportion to the strength of the first coded signal received by the second portable unit;
    wherein each receiver means determines which of a plurality of distance ranges corresponds to the distance between the first and second portable units based on the strength of the corresponding received coded signal; and
    wherein the variable rate proximity warning signal produced by each warning means takes on a particular frequency corresponding to the particular distance range determined by the corresponding receiver means to correspond to the distance between the first and second portable units.

2. The alert system of claim 1 wherein the first warning means produces an audible warning signal.

3. The alert system of claim 2 wherein the audible warning signal is a discrete sound repeated at an increasing rate as the first and second units approach each other, whereby the approximate distance between the first and second units can be determined.

4. The alert system of claim 1 wherein the second warning means produces an audible warning signal.

5. The alert system of claim 3 wherein the audible warning signal is a discrete sound repeated at an increasing rate as the first and second units approach each other, whereby the approximate distance between the first and second units can be determined.

6. The alert system of claim 1 wherein the first portable unit further includes means for finding the direction of the second coded signal received from the second portable unit.

7. The alert system of claim 1 wherein the second portable unit further includes means for finding the direction of the first coded signal received from the first portable unit.

8. The alert system of claim 1 wherein the first portable unit further includes means for producing a first coded emergency signal.

9. The alert system of claim 1 wherein the second portable unit further includes means for producing a second coded emergency signal.

10. The alert system of claim 1 wherein the first portable unit further includes a battery power source having means for indicating low battery voltage.

11. The alert system of claim 1 wherein the second portable unit further includes a battery power source having means for indicating low battery voltage.

* * * * *